2,712,925

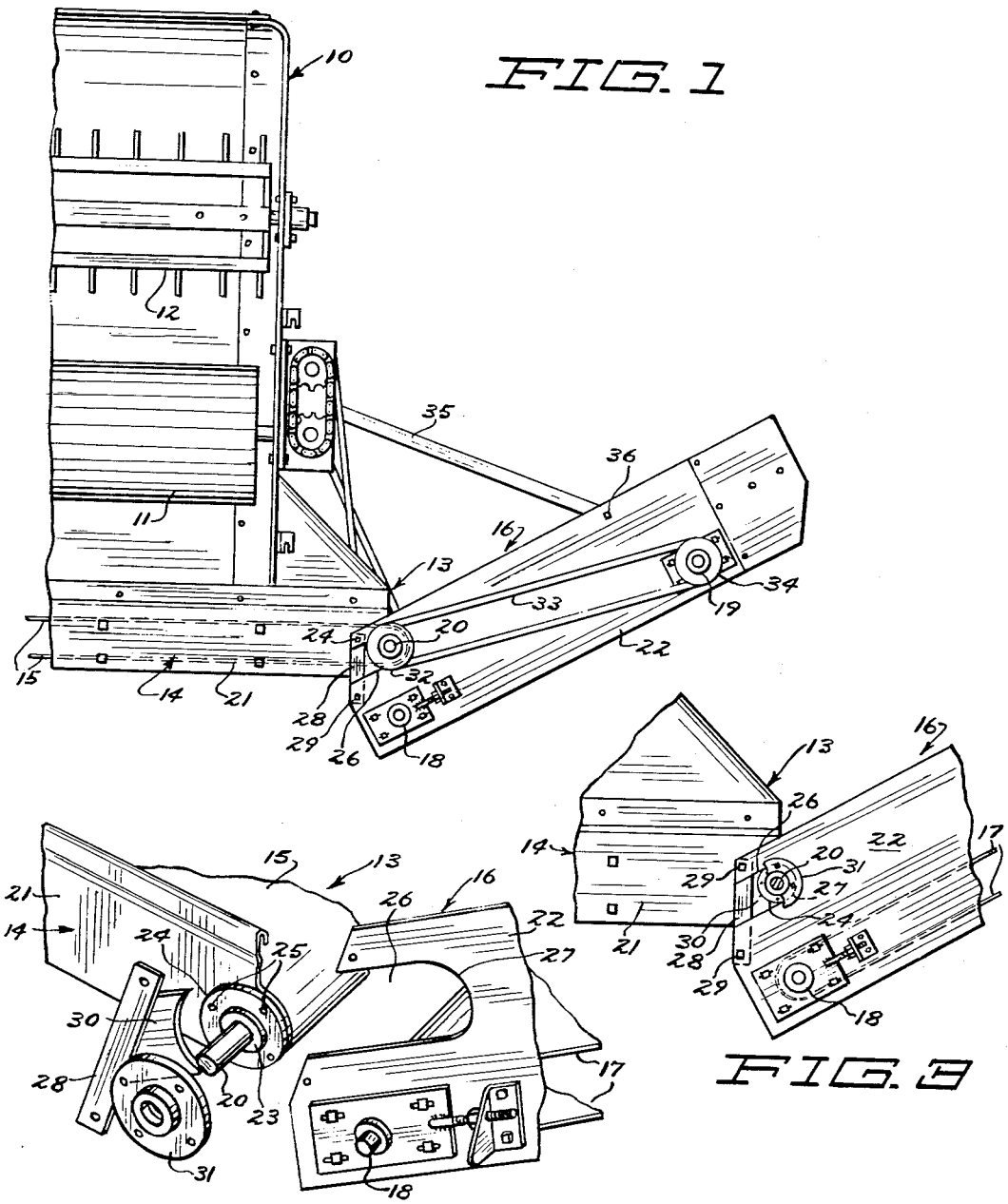

CONVEYOR PIVOT CONNECTION

Walter W. Wolfe, Mound, Minn., assignor to Superior Separator Company, Hopkins, Minn., a corporation of Delaware Original application September 15, 1951, Serial No. 246,859, now Patent No. 2,676,002, dated April 20, 1954. Divided and this application October 9, 1953, Serial No. 385,234

2 Claims. (Cl. 259—45)

This invention relates generally to improvements in material conveyors and elevators and more particularly to an improved connection for adjacent ends of a pair of such elements. The present application is a division from my copending application Serial No. 246,859, filed September 15, 1951, for Mixing and Feeding Mechanism, now U. S. Patent No. 2,676,002, issued April 20, 1954.

As disclosed in the parent application there is a need for a pivot connection between adjacent material conveying and elevating mechanisms to permit relative adjustments thereof and it is the primary object of my invention to provide such a connection which is simple and durable in construction, provides for the necessary pivot connection and serves also as a part of the bearing assembly for the moving parts with the pivot axis on the shaft of one conveyor. Another object is to provide a pivot connection or mounting for the receiving end of one conveyor by which it may be easily and quickly attached to or detached from the delivery end of another conveyor.

These and other more detailed and specific objects will be disclosed in the course of the following specification, reference being had to the accompanying drawings, in which—

Fig. 1 is an elevation of a portion of the mixing and feeding mechanism of the parent application, showing the delivery end of one conveyor and the pivot connection thereto of an elevator conveyor according to the present invention.

Fig. 2 is an "exploded" perspective view of one side of the adjacent ends of the conveyors and parts of the novel pivot connection.

Fig. 3 is an enlarged elevation detail of the pivot connection, a part of the retainer plate or flange being broken away.

Referring now more particularly and by reference characters to the drawing 10 designates the housing of a mixing and feeding mechanism such as that constituting the invention in my earlier application hereinbefore identified. The exact nature and construction of such mechanism is immaterial here but it may be noted that the housing is intended for mounting at the end of a wagon box (not shown) and includes a pair of beaters 11 and 12 which fluff and mix feed or analogous material, which material is delivered from the end 13 of a cross conveyor 14 at the bottom of said housing. This cross conveyor may have the usual apron 15 and the conveyor is so mounted that it may be removed and reversed end for end on housing 10, so that material will be delivered from either side of the wagon box. One purpose of mixer-feeders of this nature is to blend and deliver stock feeds and when mounted on the wagon box of a truck or the like the feed may be continuously mixed and dispensed to feed bunkers or in windrows as the truck travels.

For this and other uses the mixing and feeding mechanism is provided with an adjustable and detachable elevator conveyor, designated generally at 16, the purpose of which is to receive material from the discharge end 13 of the cross conveyor 14 and to then deliver this material further outward at any desired elevation within the range of adjustment provided. The elevator conveyor 16 also includes an apron 17 which operates over elongated pulleys at opposite ends of the assembly, said pulleys being carried by shafts 18 and 19. Of course, the cross conveyor apron 15 operates in a similar fashion over pulleys at opposite ends of the assembly mounted upon shafts one of which appears at 20. The two conveyors also have in common the fact that their aprons are located between spaced, parallel conveyor side plates indicated respectively at 21 and at 22 for the two, with the side plates cooperating to form trough-like structures through which material may be moved by the aprons as will be readily understood.

For proper transfer of the material it is necessary that the discharge end of the apron 15 overlie the receiving end of apron 17 and that this relationship be maintained even when the elevator conveyor 16 is swung upward and downward for adjusting the elevation at which it finally delivers the material. Also it is desirable that conveyor 16 be readily attachable to and detachable from the cross conveyor 14 whenever required. For these purposes I provide the pivot connection now to be described.

The shaft 20 of conveyor 14 extends at its extremities through the side plates 21 near the lower corners thereof and operates in bearings 23 which are centered and held in larger circular bearing plates 24 bolted or otherwise suitably secured to the side plates at 25. The thickness of these circular bearing plates 24 is at least equal to that of the side plates 22 of the elevator conveyor 16 and said side plates on their upper corner portions are provided with wide notches 26 having curved closed ends 27 adapted to slip on or straddle the bearing plates, with the side plates overlapping the adjacent portions of the cross conveyor side plates 21. The curvature of the notch ends 27 conforms to that of the bearing plates so that this engagement provides a pivot about which conveyor 16 may swing. Since the pivot axis is on the shaft 20 the adjacent ends of the two aprons will retain their proper spaced relationship. The pivot connection is completed and locked by lock bars 28 which span the open ends of the notches 26 and are bolted thereto or otherwise fastened at 29, these bars carrying arcuately formed lock lugs or plates 30 which engage the bearing plates 24 in opposition to the closed ends 27 of the notches 26. Finally the connection includes circular retainer plates 31, larger in diameter than the bearing plates 24 and secured thereto by the aforesaid fasteners 26, which not only complete the shaft bearings 23 but overlie the margins of the notches 26 and lugs 30 to prevent any lateral displacement or play.

The apron 15 is driven in any suitable manner while power for operation of the apron 17 is taken off the shaft 20 by means of a pulley 32 and belt 33 to another pulley 34 on the shaft 19. The pivot axis on the shaft 20, of course, maintains the belt 33 in proper running condition in all positions of the elevator conveyor.

As set forth in detail in the parent application the elevator conveyor is adjusted and held in position by a link 35 connected at 36 to the conveyor and having an adjustable connection (not shown) to the housing 10, or by any other suitable means.

Obviously it is only necessary to unfasten the lock bars 28 and then remove the belt 33 to slip the elevator endwise off the cross conveyor, and vice versa, for removal or replacement purposes. This operation is a quick and easy one and does not in any way disturb the rest of the machine. The construction is simple, inexpensive and long wearing.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A conveyor system including a conveyor having a delivery end and an elevator conveyor having a receiving end and both conveyors having sides adapted to overlap at said ends, circular bearing plates on the sides of one conveyor, the sides of the other conveyor having notches with open ends to slip over the bearing plates and having curved closed ends to pivotally engage the said bearing plates, lock members removably mounted across the open ends of the notches and having means pivotally engaging the bearing plates opposite the closed ends of said notches, and retainer plates removably mounted on the bearing plates and overlying the margins of the said notches.

2. A material mixing and feeding mechanism of the character described for mounting on a wagon box having a power driven material conveyor, comprising in combination, a housing having an open side for receiving material from the box, a cross conveyor at the bottom of the housing and located crosswise of the box, means in the housing for mixing and feeding material from the box to the cross conveyor, the cross conveyor including spaced sides having circular bearing plates adjacent the delivery end of the conveyor and larger circular retainer plates outside the bearing plates, an elevator conveyor also having sides, said elevator conveyor sides having notches at their ends curved to pivotally fit the bearing plates inside the retainer plates on the cross conveyor sides to thereby mount the elevator conveyor for up and down swinging movements, and lock members removably secured to the elevator conveyor sides across the notches and engaging the bearing plates opposite the curved portions of the notches to hold the elevator conveyor in place.

References Cited in the file of this patent

UNITED STATES PATENTS

| | | |
|---|---|---|
| 206,982 | Sutherland | Aug. 13, 1878 |
| 460,153 | Murphy | Sept. 29, 1891 |
| 779,714 | Kemp | Jan. 10, 1905 |
| 783,771 | Anderson | Feb. 28, 1905 |

FOREIGN PATENTS

| | | |
|---|---|---|
| 712,506 | France | Oct. 3, 1931 |